United States Patent [19]

Toda et al.

[11] Patent Number: 5,675,145

[45] Date of Patent: Oct. 7, 1997

[54] SCANNING PROBE MICROSCOPE HAVING AN OPTICAL SYSTEM FOR ENABLING IDENTIFICATION OF THE SCANNING REGION AND SAMPLE OBSERVATION DURING A SCANNING OPERATION

[75] Inventors: Akitoshi Toda, Kunitachi; Takeshi Konada, Tokyo, both of Japan

[73] Assignee: Olympus Optical Co., Ltd., Tokyo, Japan

[21] Appl. No.: 498,661

[22] Filed: Jul. 3, 1995

[30] Foreign Application Priority Data

Jul. 6, 1994 [JP] Japan .................................. 6-154906

[51] Int. Cl.$^6$ ................................................ H01J 3/14
[52] U.S. Cl. ............................... 250/234; 250/306
[58] Field of Search .......................... 250/216, 234, 250/227.26, 306, 307

[56] References Cited

U.S. PATENT DOCUMENTS

| | | | |
|---|---|---|---|
| 4,893,008 | 1/1990 | Horikawa | 250/234 |
| 5,272,330 | 12/1993 | Betzig et al. | 250/216 |
| 5,304,795 | 4/1994 | Fujihira et al. | 250/234 |
| 5,408,094 | 4/1995 | Kajimura | 250/234 |

*Primary Examiner*—Edward P. Westin
*Assistant Examiner*—Kevin Pyo
*Attorney, Agent, or Firm*—Frishauf, Holtz, Goodman, Langer & Chick

[57] ABSTRACT

A scanning probe microscope includes a probe having a minute aperture formed in a distal end thereof. The probe allows light to propagate therethrough and is located close to a sample. A moving device is provided for relatively moving the probe across a surface of the sample, and an observation optical system is provided for optically observing the sample. A light source emits a light beam for generating evanescent waves, and a beam irradiation device is provided for irradiating the light beam on the sample so that the light beam is totally reflected by an optical interface of the sample. The beam irradiation means and the observation optical system share an objective located on a side of the sample opposite to the probe. A light detecting device is provided for detecting an intensity of the light introduced into the probe through the aperture formed in the distal end of the probe.

21 Claims, 6 Drawing Sheets

//5,675,145

SCANNING PROBE MICROSCOPE HAVING AN OPTICAL SYSTEM FOR ENABLING IDENTIFICATION OF THE SCANNING REGION AND SAMPLE OBSERVATION DURING A SCANNING OPERATION

BACKGROUND OF THE INVENTION

1. Field of the Invention

The present invention relates to a near-field scanning optical microscope for observing a sample by utilizing evanescent waves.

2. Description of the Related Art

A near-field scanning optical microscope (NSOM) comprises a probe having a minute aperture with a diameter of scores of nanometers or less in its distal end, which is scanned across the surface of a sample, whereby the surface configuration of the sample is observed. The NSOMs are expected to be applied to uses in the industrial and medical fields, since their resolution (corresponding to the diameter of the aperture) is much higher than that of an optical microscope whose resolution is restricted by diffraction limits.

There are two types of NSOMs, a collection mode type and an emission mode type. FIGS. 6 and 7 show the basic arrangements of the collection mode type and the emission mode type, respectively.

In the NSOM of the collection mode type, as shown in FIG. 6, a sample 56 is placed on a triangular prism 98. The NSOM is provided with a light source 26 for emitting a light beam, a beam expander 28 for adjusting the diameter of the light beam, and a mirror 100 for directing the light beam to the triangular prism 98. A probe 12, which has an aperture with a diameter shorter than the wavelength of light emitted from the light source 26, is supported on the sample 56 so as to be able to be scanned across the surface of the sample 56 as it is driven by a scanner 22 which is controlled by means of a scanner controller 24. One end of an optical fiber 14 is coupled optically to the upper end of the probe 12, and the other end to a light detector 16.

A parallel light beam emitted from the light source 26 is converted into a beam of a predetermined diameter by the beam expander 28, reflected by the mirror 100, irradiated on the triangular prism 98, and totally reflected by the interface between the sample 56 and the prism 98. When the total reflection occurs on the underside of the sample 56, evanescent waves are generated on the surface of the sample 56. When the distal end of the probe 12 gets into the region of existence of the evanescent waves, an evanescent light is converted into a propagation light by the probe end. The propagation light, which has an intensity corresponding to the distance between the probe end and the sample surface, enters into the probe 12 through the aperture at the probe end, and propagates through the optical fiber 14 to be incident upon the light detector 16. Thereupon, the light detector 16 outputs a signal which corresponds to the intensity of the incident light. A processor 18 fetches position information for the probe 12 on the sample surface from the scanner controller 24, computes information for the sample surface from the output signal from the light detector 16, and processes these informations synchronously, thereby forming a three-dimensional image of the surface of the sample 56. This three-dimensional image is displayed on a monitor 20.

In the NSOM of the emission mode type, as shown in FIG. 7, the sample 56 is placed on a condensing lens 102. A light detector 94 for outputting a signal corresponding to the intensity of incident light is located under the lens 102 with a condensing lens pupil 104 between the two. The probe 12 is supported on the sample 56 so as to be able to be scanned across the sample surface as it is driven by the scanner 22 which is controlled by means of the scanner controller 24. One end of the optical fiber 14 is coupled optically to the upper end of the probe 12, while the other end of the fiber 14 is coupled optically to the light source 26 for emitting a parallel beam through an optical fiber coupling lens 92 and the beam expander 28. The probe 12 has an aperture with a diameter shorter than the wavelength of light emitted from the light source 26.

A parallel beam emitted from the light source 26 is converted into a light beam of a predetermined diameter by the beam expander 28, it is introduced into the optical fiber 14 by the optical fiber coupling lens 92, and propagates through the fiber 14 to be incident upon the probe 12. As a result, evanescent waves are emitted from the aperture at the distal end of the probe 12. A light produced as the evanescent waves are influenced by the sample 56 is incident on the condensing lens 102, whereupon a light component transmitted through the condensing lens pupil 104 lands on the light detector 94. The processor 18 fetches position information for the probe 12 with respect to the sample surface from the scanner controller 24, computes information for the sample surface on the basis of the output signal from the light detector 94, and processes these informations synchronously, thereby forming a three-dimensional image of the surface of the sample 56. This three-dimensional image is displayed on a monitor 20.

The conventional NSOMs described above are subject to the following drawbacks. According to the NSOM of the collection mode type, as shown in FIG. 6, the triangular prism 98 is situated under the sample 56, so that it is difficult to secure a space for an observation optical system, such as an optical microscope, which enables identification of the scanning region and sample observation during scanning operation.

According to the NSOM of the emission mode type, an observation optical system for enabling identification of the scanning region and sample observation during scanning operation, cannot be easily incorporated in the NSOM by using the condensing lens 102 in common between the optical system and the NSOM. This is because the light emitted from the aperture at the distal end of the probe 12 contains light components diffracted by the aperture, as well as the evanescent waves. Thus, the optical microscope cannot be incorporated by having the objective thereof double as the condensing lens 102, and it is necessary to provide a mechanism for separating light components obtained by means of the lens 102 between the evanescent waves and diffracted light components.

SUMMARY OF THE INVENTION

The object of the present invention is to provide a near-field scanning optical microscope with an optical system which enables identification of the scanning region and sample observation during scanning operation.

In order to achieve this object, the scanning probe microscope of the present invention includes a probe having a minute aperture formed in a distal end thereof. The probe allows light to propagate therethrough and is located close to a sample. A moving device is provided for relatively moving the probe across a surface of the sample, and an observation optical system is provided for optically observing the sample. A light source emits a light beam for generating evanescent waves, and a beam irradiation device is provided for irradiating the light beam on the sample so that the light beam is totally reflected by an optical interface of the sample. The beam irradiation means and the observation optical system share an objective located on a side of the sample opposite to the probe. A light detecting device is provided for detecting an intensity of the light introduced into the probe through the aperture formed in the distal end of the probe.

Additional objects and advantages of the invention will be set forth in the description which follows, and in part will be obvious from the description, or may be learned by practice of the invention as particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will now be described with reference to the accompanying drawings.

Figure 1:
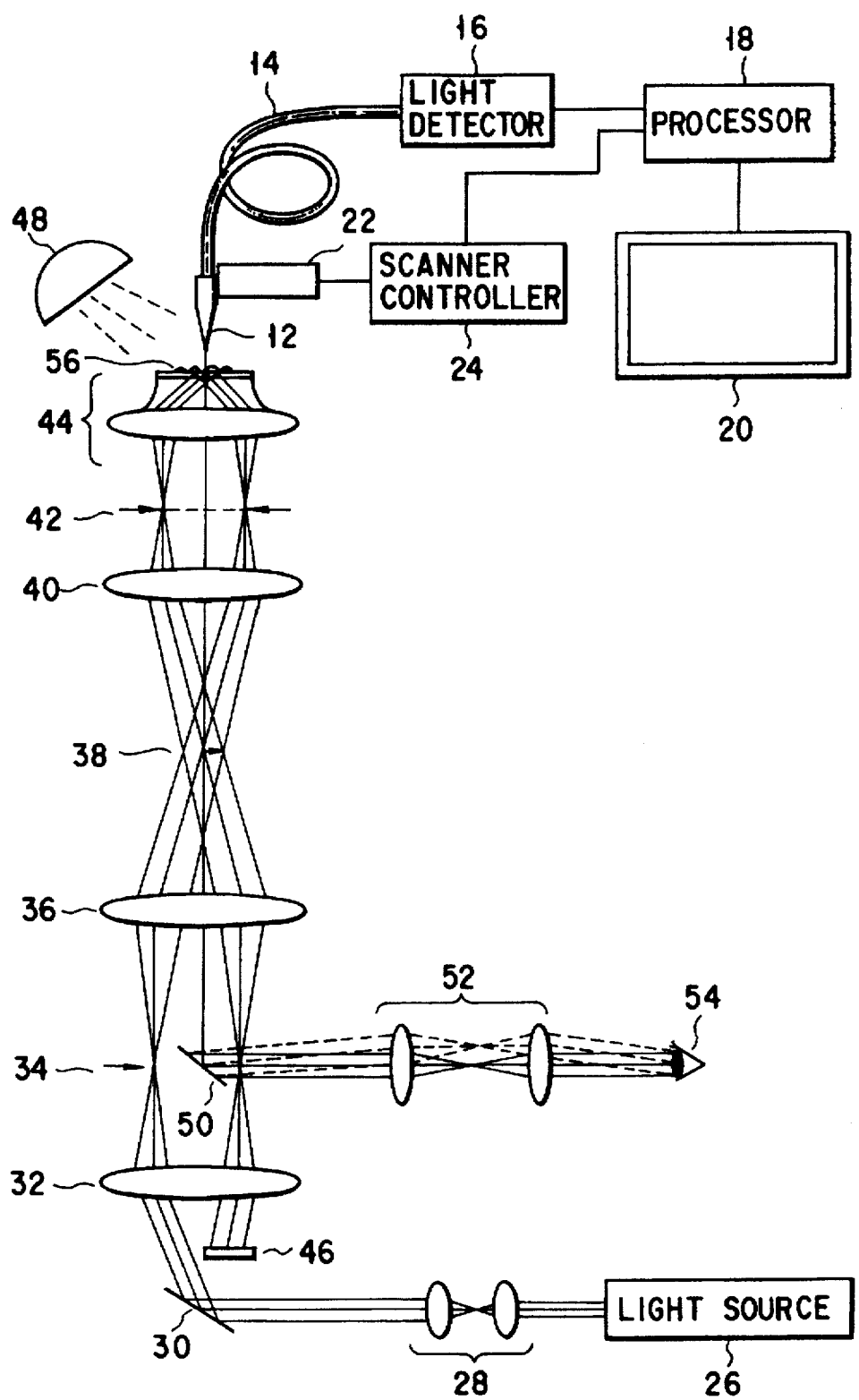
FIG. 1 shows an arrangement of a near-field scanning optical microscope of the collection mode type according to a first embodiment of the present invention.
Figure 6:
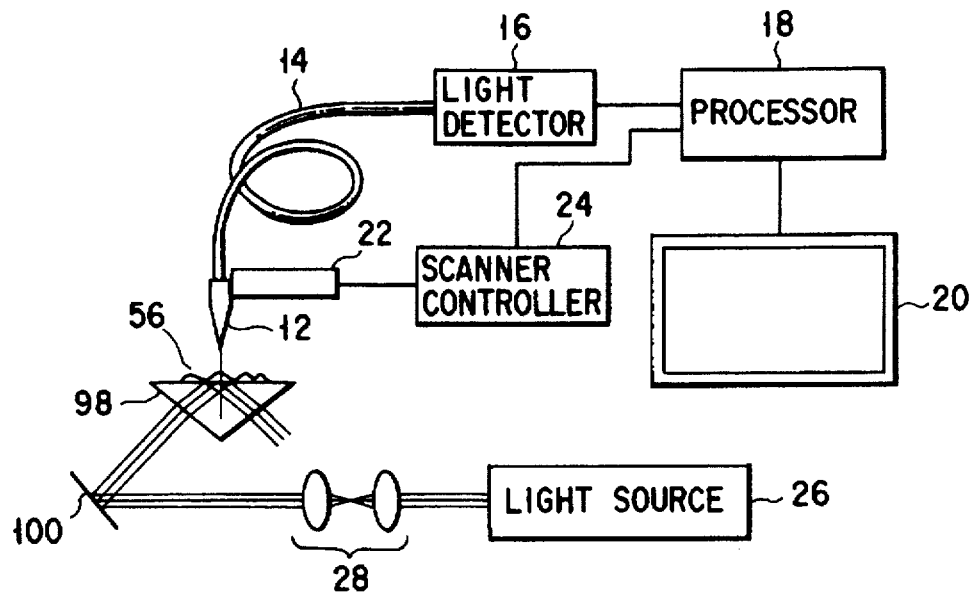
FIG. 6 shows the basic arrangement of the nearfield scanning optical microscope of the collection mode type.

Referring first to FIG. 1, a near-field scanning optical microscope according to a first embodiment will be described. The near-field scanning optical microscope according to the present embodiment is of the collection mode type whose basic arrangement has already been described with reference to FIG. 6. In FIGS. 1 and 6, like reference numerals refer to like or common components. Since these common components have already been described in detail in the paragraphs related to the prior art, a detailed description of those components will be omitted.

As shown in FIG. 1, a sample 56 is placed over an immersed objective 44 with a suitable liquid, e.g., water, between the two. A probe 12 is supported by a scanner 22 for scanning operation and located on the sample 56. The probe 12 is coupled optically to a light detector 16 by means of an optical fiber 14. An illuminator 48 for illuminating the sample 56 is located diagonally above the sample 56. An image forming lens 40, a pupil projecting lens 36, and a pupil image forming lens 32 are arranged under the objective 44. A pupil dividing mirror 50 is located in the position of a projected pupil 34, whereby light passing through the central portion of the pupil 34 is deflected toward an eyepiece optical system 52. The pupil image forming lens 32 is underlain by a mirror 30 which serves to deflect a light beam emitted from a light source 26 and expanded by means of a beam expander 28. The lens 32 is supported in a manner such that its direction is variable. The image forming lens 32 is also underlain by a douser 46 for shielding a light beam which is totally reflected by the objective-side interface of the sample 56.

The light beam emitted from the light source 26 is expanded to a predetermined diameter by the beam expander 28, is reflected by the mirror 30, is incident on the pupil image forming lens 32, and is temporarily converged on the plane of the projected pupil 34 which is optically conjugate to an immersed objective pupil 42. Thereafter, the light beam is transmitted through the pupil projecting lens 36, and is then converged again on the plane of the objective pupil 42 by the image forming lens 40. Then, the light beam is output as a parallel light (plane waves) from the immersed objective 44, and is incident upon the objective-side interface of the sample 56. The angle of incidence, in this case, is adjusted to a desired angle not smaller than a critical angle by regulating the direction of the mirror 30. The parallel light is totally reflected by the objective-side interface of the sample 56, thus generating evanescent waves on the probe-side interface of the sample. The parallel light, totally reflected in this manner, reaches the douser 46 after passing through the immersed objective 44, image forming lens 40, pupil projecting lens 36, and pupil image forming lens 32.

The following is a description of a general point of view for the adjustment of the angle of incidence of the parallel light upon the objective-side interface of the sample 56.

When a small-diameter emanative light beam, which travels parallel to the optical axis and can be considered to have been radiated from one point on the pupil plane of the objective, is incident on the peripheral edge portion of the objective, a parallel light beam exits from the objective. The exit angle corresponds to the distance from the center of the optical axis to the point (hereinafter referred to as imaginary point light source) on the pupil plane from which the light beam can be considered to have been radiated. Assuming that the distance (radius) from the center of the optical axis to the imaginary point light source on the pupil plane, the exit angle on the objective, and the refractive index of an exit-side medium of the objective are R, $\theta_1$, and n1, the following relation is established.

$$R = n_1 \sin\theta_1 \quad (=\text{N.A. of objective}). \tag{1}$$

As seen from equation (1), the parallel light beam can be incident on the sample at any desired angle within the range of the N.A. (numerical aperture) of the objective by settling the position of incidence upon the pupil plane of the objective. Thus, the parallel light beam can be totally reflected by the interface of the sample if the imaginary point light source is located in a position for the radius R which corresponds to the critical angle for total reflection.

The total reflection of the parallel light beam by the sample interface, that is, the generation of evanescent waves, requires the N.A. of the objective to be not smaller than the value of the refractive index $n_2$ of the probe-side medium, as is evident from the Snell's law. Thus, there is a relation $$N.A. > n_2 \quad (2)$$

If the probe-side medium is air, therefore, the objective requires the N.A. of 1.00 or more. If the medium is water, the N.A. is expected to be 1.33 or more. A conventional immersed objective, having the N.A. of 1.40, is in conformity with conditions for these circumstances.

Since the pupil plane of the objective is narrow, it is difficult actually to locate the light source on the pupil plane. Therefore, the aforesaid arrangement of the imaginary point light source is applied to a plane which is obtained by projecting the pupil plane of the objective by means of a suitable optical system. If the magnification of objective pupil projection by means of the optical system is β, in this case, the distance (radius) $R_{PROJ}$ from the center of the optical axis to the imaginary point light source on the pupil plane is given by $$R_{PROJ} = \beta R = \beta n_1 \sin\theta_1 \quad (3)$$

Thus, by converging the light beam parallel to and off the optical axis on the plane in which the objective pupil plane is projected, and by changing the position (distance from the optical axis center) of the point of convergence, the angle of incidence of the parallel light beam can be changed as required without varying the position of incidence.

What is totally reflected by the interface of the sample is the light outside a circle of a radius corresponding to the N.A. which is equivalent to the refractive index value of the probe-side medium. In other words, the light incident upon the region inside the circle is not totally reflected by the sample interface, and is not conducive to the generation of the evanescent waves.

As is evident from the above description, the angle of incidence of the parallel light beam incident upon the objective-side interface of the sample 56 can be adjusted to an optimum angle for the generation of the evanescent waves on the probe-side interface of the sample 56 by changing the direction of the mirror 30 to vary the distance from the optical axis center to the point of convergence on the plane of the projected pupil 34. It should be noted that the parallel light is incident upon the same portion of the objective-side interface of the sample 56 at all times without reference to the direction of the mirror 30.

By adjusting the beam expander 28 to augment the diameter of the light beam, moreover, the area of incidence of the parallel light beam upon the sample 56 can be increased to cope with wide-range scanning.

The evanescent waves generated on the probe-side interface of the sample 56 are detected by the probe 12. As mentioned above, the probe 12 is scanned across the surface of the sample 56 by the scanner 22, and the signal corresponding to the distance between the distal end of the probe 12 and the surface of the sample 56 is delivered from the light detector 16. The processor 18 processes the output signal from the detector 16 and the position information from the scanner controller 24 synchronously, thereby forming an image of the surface of the sample 56. This image is displayed on the monitor 20.

The NSOM according to the present embodiment comprises an observation optical system, such as a conventional optical microscope, which is composed of the immersed objective 44, image forming lens 40, pupil projecting lens 36, pupil dividing mirror 50, and eyepiece optical system 52.

The image of the sample 56 illuminated by the illuminator 48 is enlarged and focused on an intermediate image forming plane 38 by the immersed objective 44 and the image forming lens 40, and its pupil is projected on the projected pupil 34 by the pupil projecting lens 36. Further, the sample image is guided to the eyepiece optical system 52 by the pupil dividing mirror 50 to be focused, and is observed by an observer 54. Passing through the region outside the pupil dividing mirror 50, the light beam for the generation of the evanescent waves, emitted from the light source 26, is fully separated from the observation light, and can never be incident upon the observation optical system. The pupil dividing mirror 50 is circular and is sized so that its radius is not greater than $R_{PROJ}$ of equation (3).

Figure 2:
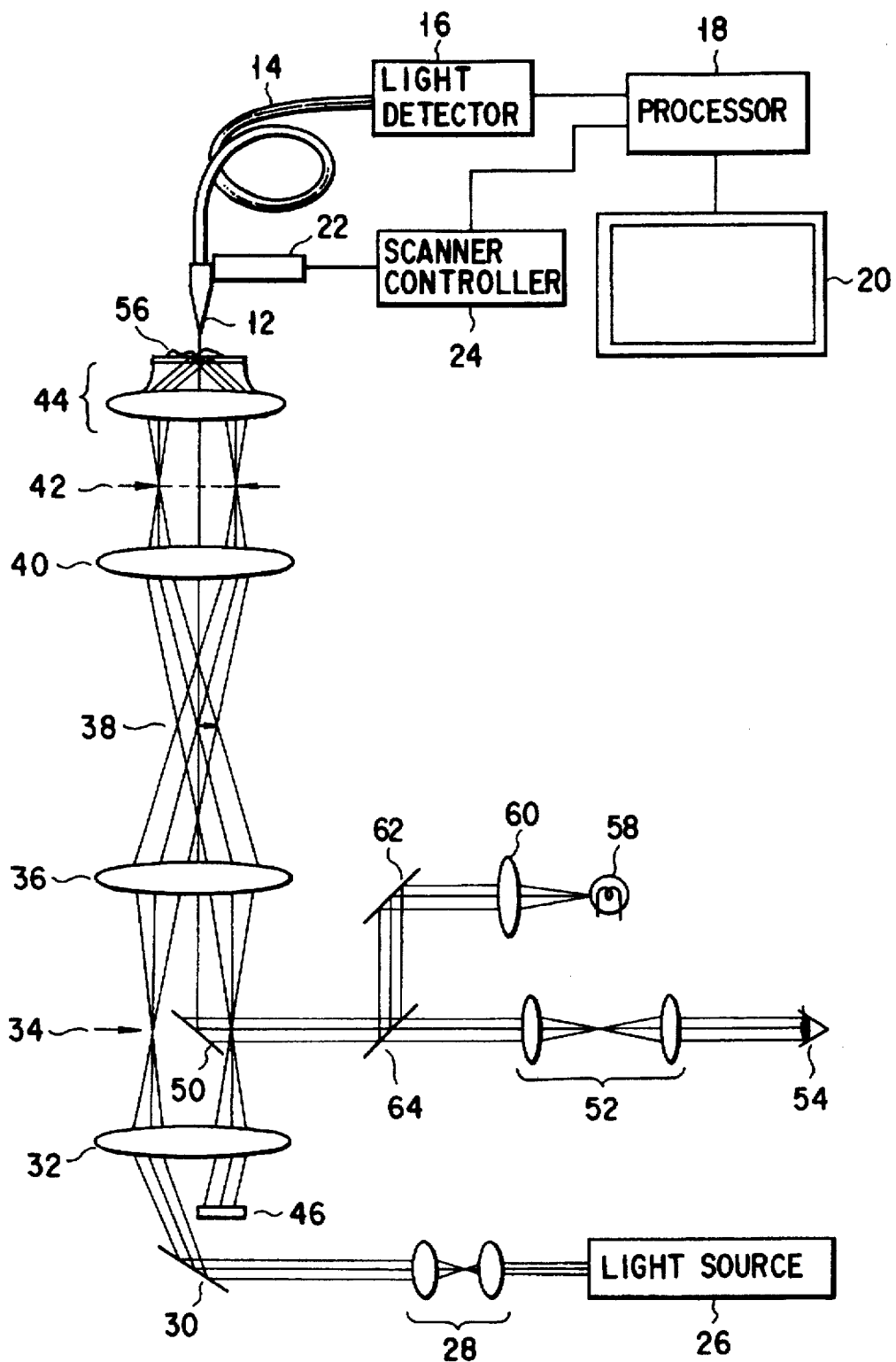
FIG. 2 shows an arrangement of a modification of the near-field scanning optical microscope of FIG. 1.

Referring now to FIG. 2, a modification of the present embodiment will be described. According to this modification, as shown in FIG. 2, an illumination optical system incorporating an observation optical system is used in place of the illuminator 48 for applying light directly to the sample 56. Except for this arrangement, the modification is constructed in the same manner as the embodiment. The illumination optical system includes an illumination light source 58, a collimator lens 60 for changing an illumination light emitted from the light source 58 into a parallel light, a reflecting mirror 62 for deflecting the illumination light from the collimator lens, and a beam splitter, e.g., a half-mirror 64, for coupling the illumination light reflected by the reflecting mirror to the observation optical system.

The illumination light emitted from the illumination light source 58 is coupled to the observation optical system by means of the half-mirror 64 after being transmitted through or reflected by the collimator lens 60 and the reflecting mirror 62, and is reflected by the pupil dividing mirror 50. Thereafter, the illumination light is transmitted through the pupil projecting lens 36, image forming lens 40, and immersed objective 44, thus illuminating the sample 56 from below.

Figure 3:
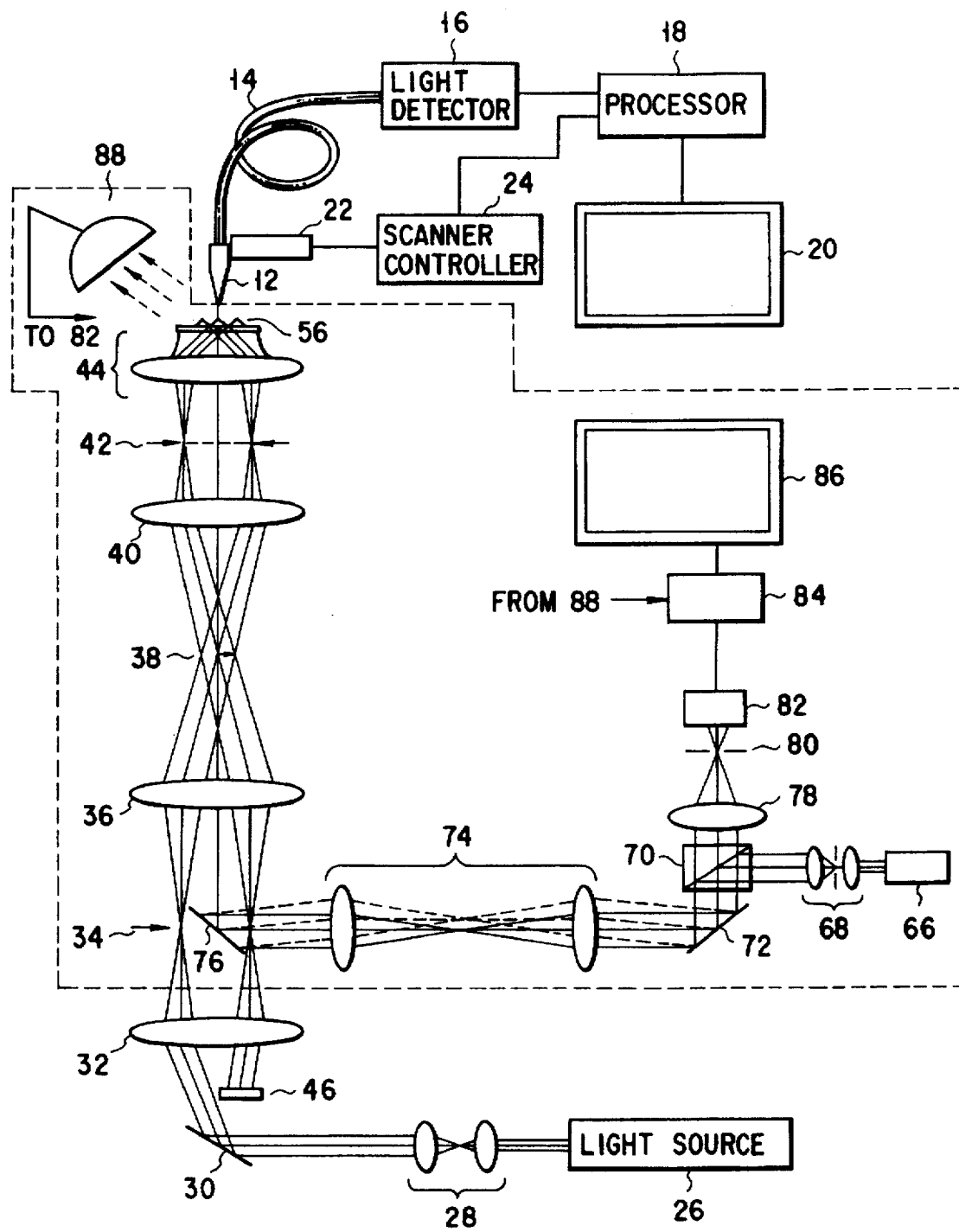
FIG. 3 shows an arrangement of a near-field scanning optical microscope of the collection mode type according to a second embodiment of the invention.

Referring now to FIG. 3, a near-field scanning optical microscope according to a second embodiment will be described. The microscope of the present embodiment is of the collection mode type, and is constructed in the same manner as the one according to the first embodiment except that a laser scanning microscope (LSM) is used in place of the observation optical system of the first embodiment. In the following paragraphs, therefore, only the laser scanning microscope, which constitutes an observation optical system, will be mentioned, and a description of the other components already described in connection with the first embodiment will be omitted.

As illustrated in that block of FIG. 3 which is surrounded by broken line, the laser scanning microscope includes a laser source 66, beam expander 68 having a pinhole therein for expanding a light beam emitted from the laser source, beam splitter 70 for separating forward and backward paths, x-scanner 72 for deflecting the light beam in an x-direction, pupil transmission optical system 74, y-scanner 76 for deflecting the light beam in a y-direction perpendicular to the x-direction, pupil projecting lens 36, image forming lens 40, and immersed objective 44. The laser scanning microscope further comprises a confocal lens 78 for converging return light from a sample, a pinhole 80 located in a confocal position with respect to the pinhole in the beam expander 68, a detector 82 located behind the pinhole 80, a light transmission detector 88 for detecting light scattered or diffracted by the sample, a processor 84 for forming an image of the sample in accordance with the respective outputs of the detectors 82 and 88, and a monitor 86 for displaying the image formed by the processor.

Using the confocal optical system, the laser scanning microscope of this type can produce a high-contrast image, and the transmission detection method enables observation of difference images, such as differential interference images, and special microscopy such as photon counting.

According to the present embodiment, there may be provided a microscopic apparatus which combines as high-resolution near-field scanning optical microscope and a laser scanning microscope capable of special microscopy.

Figure 4:
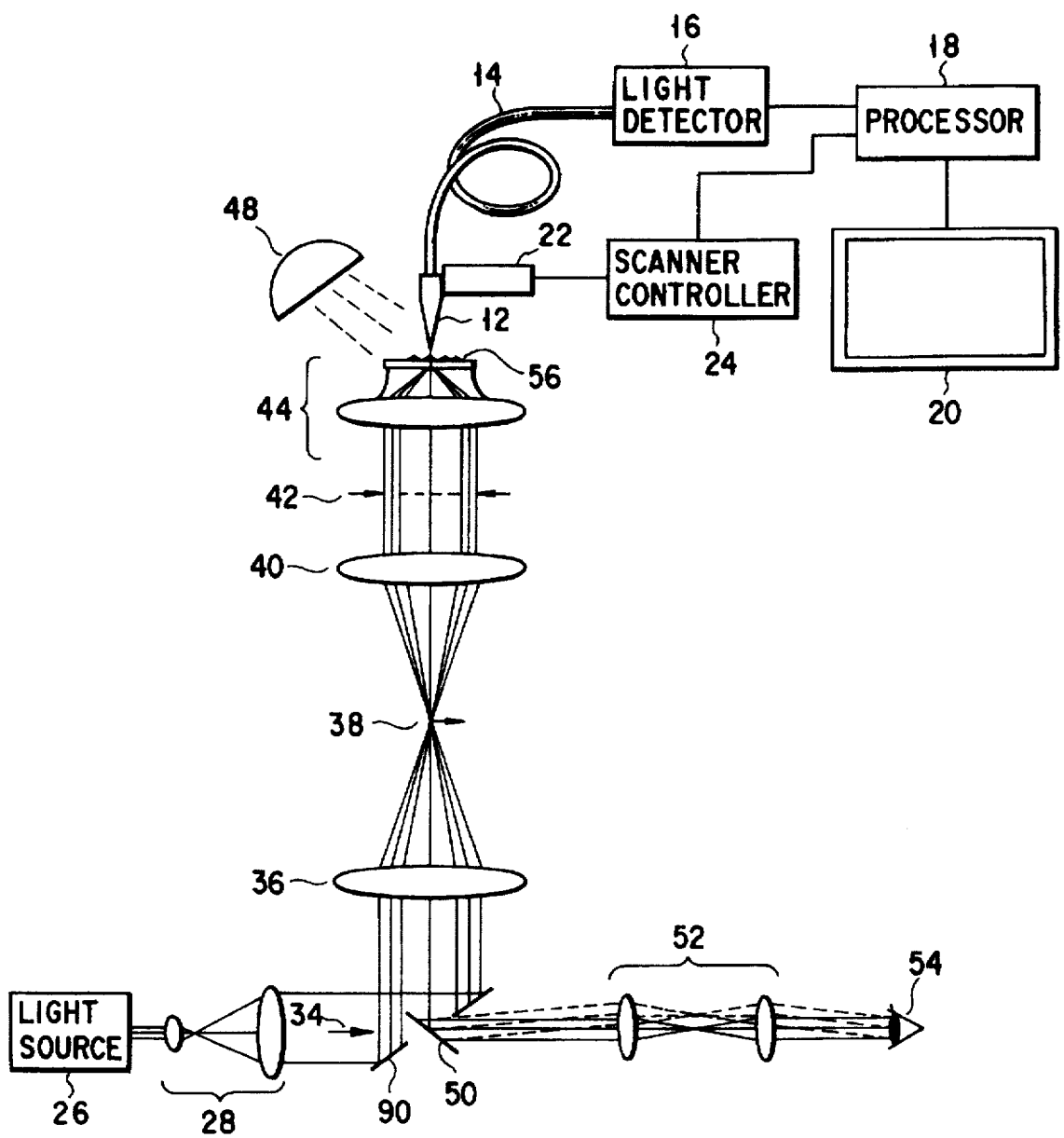
FIG. 4 shows an arrangement of a near-field scanning optical microscope of the collection mode type according to a third embodiment of the invention.

Referring now to FIG. 4, a near-field scanning optical microscope according to a third embodiment will be described. The microscope of the present embodiment is of the collection mode type, and its basic arrangement is similar to that of the one according to the first embodiment. In the following description, therefore, like reference numerals are used to designate the components already described in connection with the first embodiment, and a detailed description of those components will be omitted.

A beam expander 28 expands a light beam emitted from a light source 26 to the diameter of an objective pupil 42 which is projected by means of a pupil projecting lens 36. A ring-shaped variable-direction mirror 90 for selectively reflecting the outer portion of the light beam from the beam expander 28 is supported in the position of a projected pupil 34 in a manner such that its direction can be changed. The variable-direction mirror 90 permits the position of the spot, which is formed with the result that the light beam is incident on the sample 56, to be varied horizontally. For other components, the third embodiment is arranged in the same manner as the first embodiment.

The light beam emitted from the light source 26 is increased in diameter by the beam expander 28, and only its outer portion is reflected by the scanning mirror 90, irradiated in the form of a tubular light beam on the pupil projecting lens 36, and temporarily converged on an intermediate image forming plane 38. Thereafter, the tubular light beam is transmitted through an image forming lens 40 to be incident upon an immersed objective 44 as a parallel light, and is focused on a sample 56. The light beam is supplied on the objective-side interface of the sample 56 at an angle not smaller than the critical angle, thereby forming a spot on the interface. As a result, evanescent waves are generated on that portion of the probe-side interface of the sample 56 which is situated opposite the spot. The position of the spot is adjusted by changing the direction of the variable-direction mirror 90 so that it is brought to the position of a probe 12.

In the present embodiment, the light beam which generates the evanescent waves is tubular in shape, and is converged and applied as a spot to the objective-side interface of the sample 56. Accordingly, the energy density is increased, so that the intensity of the evanescent waves generated on the probe-side interface of the sample 56 is augmented.

Figure 5:
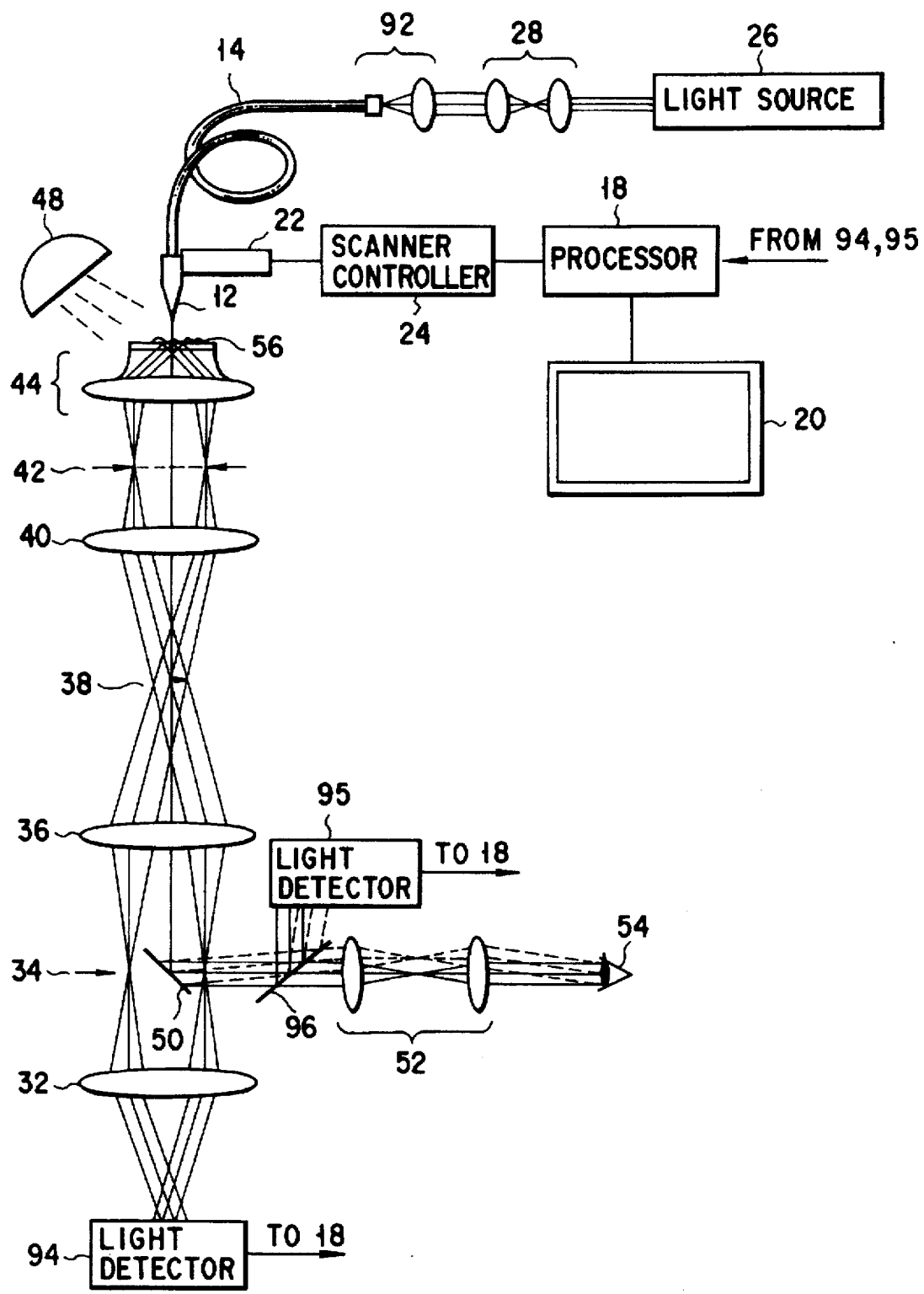
FIG. 5 shows an arrangement of a near-field scanning optical microscope of the emission mode type according to a fourth embodiment of the invention.
Figure 7:
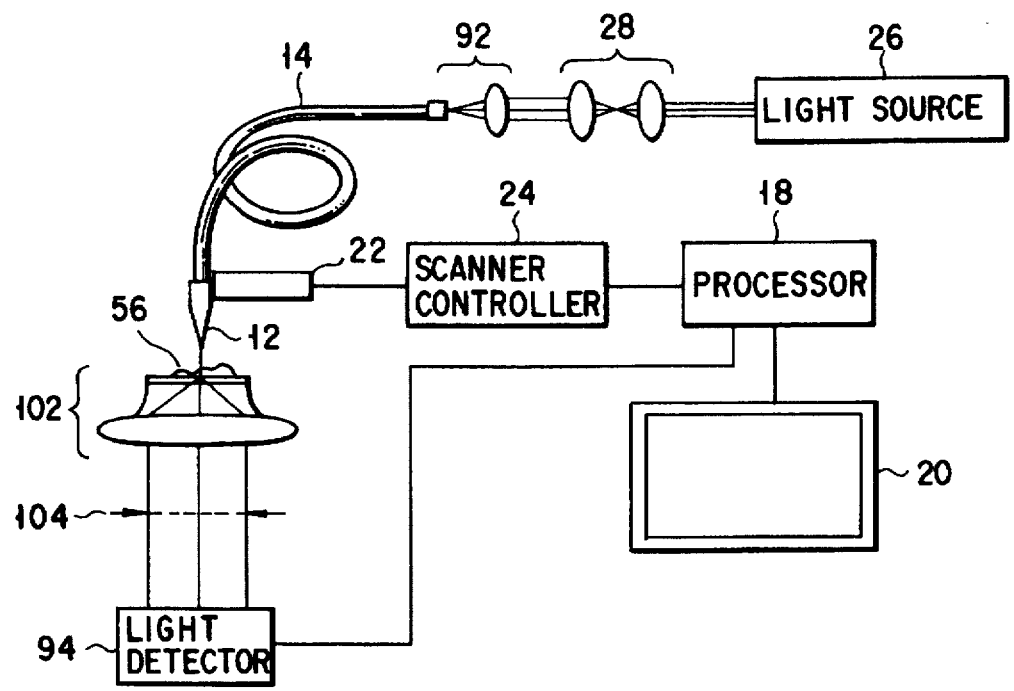
FIG. 7 shows the basic arrangement of the near-field scanning optical microscope of the emission mode type.

Referring now to FIG. 5, a near-field scanning optical microscope according to a fourth embodiment will be described. The near-field scanning optical microscope according to the present embodiment is of the emission mode type whose basic arrangement has already been described with reference to FIG. 7. In FIGS. 5 and 7, like reference numerals refer to like or common components. Since these common components have already been described in detail in the paragraphs related to the prior art, a detailed description of those components will be omitted. Also, the present embodiment is similar to the first embodiment, so that like reference numerals are used to designate the components already described in connection with the first embodiment, and a detailed description of those components will be omitted.

As shown in FIG. 5, a light source 26 is coupled to an optical fiber 14 through a beam expander 28 and an optical fiber coupling lens 92. A light detector 94 is located under a pupil image forming lens 32. A dichroic mirror 96 is located between a pupil dividing mirror 50 and an eyepiece optical system 52, and a light detector 95 is provided to receive a reflected light by the dichroic mirror 96. The dichroic mirror 96 reflects only a diffraction light emitted from a probe 12, and transmits an observation light which has wavelengths different from that of the diffraction light. The detector 95 receives the diffracted light reflected by the mirror 96.

A light beam emitted from the light source 26 is expanded by the beam expander 28, then is introduced into the optical fiber 14 through the optical fiber coupling lens 92. The light beam propagating through the fiber 14 is incident into the probe 12, whereupon evanescent waves, along with a diffraction light, are emitted from a minute aperture at the distal end of the probe 12. In a sample 56, the evanescent waves are converted into a light which propagates at an angle above the critical angle, while the diffraction light forms a light which propagates at an angle smaller than the critical angle. These two lights are separated by the pupil dividing mirror 50. More specifically, the light based on the evanescent waves forms a tubular beam, which passes through the region outside the mirror 50 to be incident upon the pupil image forming lens 32. Then, the light beam is applied to the light detector 94 under the lens 32, whereupon its intensity is detected. On the other hand, the diffraction light is reflected by the pupil dividing mirror 50, then is reflected by the dichroic mirror 96 to be incident upon the light detector 95, whereupon its intensity is detected. Output signals from the detectors 94 and 95 are applied to a processor 18. The processor 18 processes these input signals in synchronism with position information from a scanner controller 24, thereby forming an image of the surface configuration of the sample 56 or the like. This image is displayed on a monitor 20.

Additional advantages and modifications will readily occur to those skilled in the art. Therefore, the invention in its broader aspects is not limited to the specific details, and representative devices shown an described herein. Accordingly, various modifications may be effected without departing from the spirit or scope of the general inventive concept as defined by the appended claims and their equivalents. For example, in the embodiments mentioned above, the probe 12 is scanned by the scanner 22, however, the probe 12 may be fixed, in this case, the sample 56 is scanned.

What is claimed is:

1. A scanning probe microscope comprising:

a probe having a minute aperture formed in a distal end thereof, the probe allowing light to propagate therethrough and being located close to a sample;

moving means for relatively moving the probe across a surface of the sample;

an observation optical system for optically observing the sample:

a light source which emits a light beam for generating evanescent waves;

beam irradiation means for irradiating the light beam on the sample so that the light beam is totally reflected by an optical interface of the sample, the beam irradiation means and the observation optical system sharing an objective located on a side of the sample opposite to the probe;

light detecting means for detecting an intensity of light introduced into the probe through the aperture formed in the distal end of the probel and means for separating the light beam and an observation light, said separating means including a pupil dividing mirror in a central portion of an optical axis on a plane conjugate to a pupil plane of the objective.

2. A scanning probe microscope according to claim 1, further comprising an illumination optical system for illuminating the sample.

3. A scanning probe microscope according to claim 2, wherein said illumination optical system includes an illumination light source for emitting an illumination light and means for coupling the illumination light to the observation optical system.

4. A scanning probe microscope according to claim 1, wherein said observation optical system comprises a laser scanning microscope.

5. A scanning probe microscope according to claim 1, wherein said beam irradiation means includes converging means for converging the light beam emitted by the light source on a position outside the pupil dividing mirror on the plane conjugate to the pupil plane of the objective, and converting means for converting the light beam into a convergent light beam shifted from and parallel to the optical axis, whereby the convergent light beam is irradiated on the optical interface of the sample as a parallel beam and is totally reflected by the optical interface of the sample.

6. A scanning probe microscope according to claim 5, wherein said beam irradiation means includes means for adjusting a distance from a center of the optical axis to a point of convergence of the light beam, whereby an angle of incidence of the parallel convergent light beam on the optical interface of the sample is adjusted.

7. A scanning probe microscope according to claim 6, wherein said converting means includes a pupil image forming lens, and said adjusting means includes a variable-direction mirror for deflecting and directing the light beam emitted by the light source to the pupil image forming lens at a position shifted from the center of the optical axis.

8. A scanning probe microscope according to claim 5, wherein said beam irradiation means further includes means for adjusting a diameter of the light beam emitted by the light source.

9. A scanning probe microscope according to claim 6, wherein said beam irradiation means further includes means for adjusting a diameter of the light beam emitted by the light source.

10. A scanning probe microscope according to claim 1, wherein said beam irradiation means includes a ring-shaped mirror located on the plane conjugate to the pupil plane of the objective so as to surround the pupil dividing mirror, the ring-shaped mirror converting the light beam emitted by the light source into a tubular light beam parallel to the optical axis, whereby the light beam is irradiated on the optical interface of the sample from all directions of radiation.

11. A scanning probe microscope according to claim 10, further comprising means for changing a direction of the ring-shaped mirror, whereby position of a convergent spot formed on the optical interface of the sample can be changed.

12. A scanning probe microscope according to claim 1, wherein said pupil dividing mirror has a shape such that its projection onto a plane perpendicular to the optical axis is circular.

13. A scanning probe microscope comprising:
a probe having a minute aperture formed in a distal end thereof, the probe allowing light to propagate therethrough and being located close to a sample;
moving means for relatively moving the probe across a surface of the sample;
an observation optical system for optically observing the sample;
a light source which emits a light beam for generating evanescent waves;
beam irradiation means for irradiating the light beam on the sample so that the light beam is totally reflected by an optical interface of the sample, the beam irradiation means and the observation optical system sharing an objective located on a side of the sample opposite to the probe;
separating means for separating the light beam and an observation light at a position where the observation light travels surrounded by the light beam; and
light detecting means for detecting an intensity of light introduced into the probe through the aperture formed in the distal end of the probe.

14. A scanning probe microscope comprising:
a probe having a minute aperture formed in a distal end thereof, the probe allowing light to propagate therethrough and being located close to a sample;
moving means for relatively moving the probe across a surface of the sample;
an observation optical system for optically observing the sample;
a light source which emits a light beam for generating evanescent waves;
beam introducing means for introducing the light beam into the probe so that light including the evanescent waves is emitted from the aperture in the distal end of the probe; and
light detecting means for detecting at least one of;
first light which is directed to a first region at an angle greater that a critical angle, and
second light which is directed to a second region at an angle less than the critical angle,
the first and second light being generated by light emitted from the aperture of the distal end of the probe,
the first region excluding an area occupied by a dividing mirror and the second region including an area occupied by the dividing mirror, wherein the area occupied by the dividing mirror has an axis coincident with the probe axis and the critical angle being the smallest angle at which the evanescent waves are converted into propagating light;
said observation optical system and said light detecting means sharing an objective located on a side of the sample opposite to the probe.

15. A scanning probe microscope according to claim 14, wherein said dividing means includes a pupil dividing mirror in a central portion of an optical axis on a plane conjugate to a pupil plane of the objective.

16. A scanning probe microscope according to claim 15, wherein said pupil dividing mirror bas a shape such that its projection onto a plane perpendicular to the optical axis is circular.

17. A scanning probe microscope according to claim 14, wherein said light detecting means includes a first light detector for detecting the first light and a second light detector for detecting the second light.

18. A scanning probe microscope according to claim 14, wherein the first light is generated by the evanescent waves emitted from the aperture in the distal end of the probe and constitutes a tubular light beam, and wherein the second light constitutes diffraction light and passes through an inner side of the tubular light beam of the first light.

19. A scanning probe microscope according to claim 18, wherein said dividing mirror includes a pupil dividing mirror in a central portion of an optical axis on a plane conjugate to a pupil plane of the objective.

20. A scanning probe microscope according to claim 19, wherein said pupil dividing mirror has a shape such that its projection onto a plane perpendicular to the optical axis is circular.

21. A scanning probe microscope according to claim 19, further comprising means for separating diffracted light from light delivered by the pupil dividing mirror.

\* \* \* \* \*